Nov. 1, 1960 F. W. YOUNG 2,958,537
BRAKE MECHANISM FOR TELESCOPING CARTS
Filed Aug. 11, 1959 3 Sheets-Sheet 1
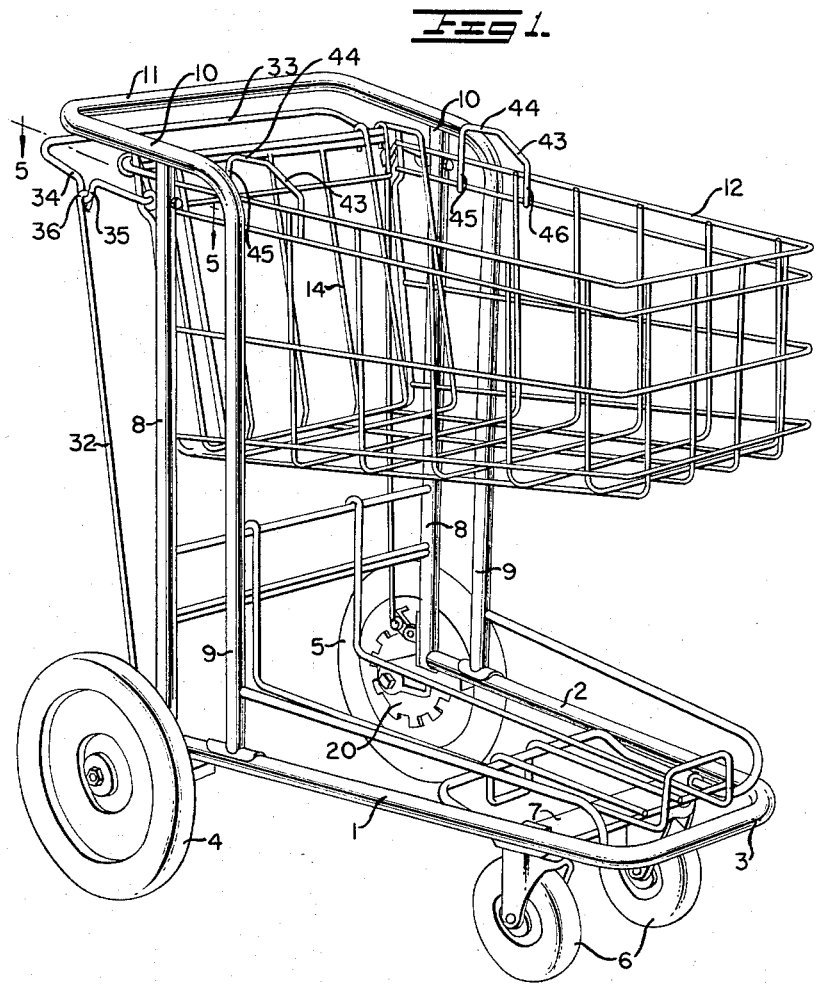
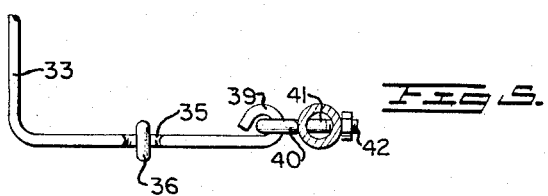
INVENTOR
FRED W. YOUNG
BY
ATTORNEY Nov. 1, 1960 F. W. YOUNG 2,958,537
BRAKE MECHANISM FOR TELESCOPING CARTS
Filed Aug. 11, 1959 3 Sheets-Sheet 2

INVENTOR
FRED W. YOUNG

BY *Ralph L. Barrett*

ATTORNEY

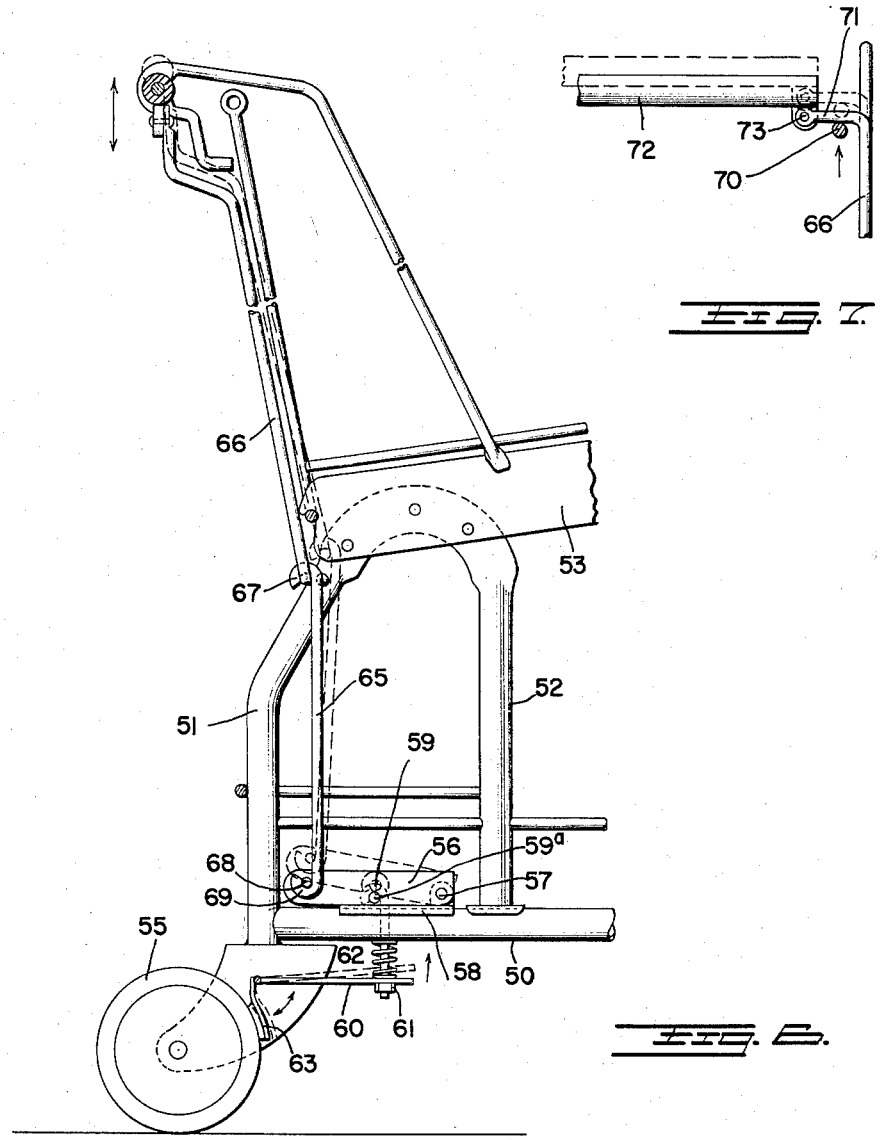

United States Patent Office 2,958,537
Patented Nov. 1, 1960

1

2,958,537

BRAKE MECHANISM FOR TELESCOPING CARTS

Fred W. Young, 1248 W. Main St., Oklahoma City, Okla., assignor to Sylvan N. Goldman, Oklahoma City, Okla.

Filed Aug. 11, 1959, Ser. No. 833,084

5 Claims. (Cl. 280—33.99)

This invention relates to the provision of brake facilities for telescoping carts and particularly to telescoping carts of the carry-out type.

It is customary for retail stores to permit customers to utilize the conventional telescoping grocery carts or to provide similarly constructed specially built carts for transporting the grocery load from the checkout counter to the customer's car which may be parked at some distance from the store. Normally these telescoping carts are of the free wheeling type, i.e. no provision is made to lock or brake the cart for holding it against rolling. Where a loaded cart is used to transport groceries to a car on a parking lot that is inclined from the horizontal for drainage or of irregular contour, considerable difficulty is experienced in preventing the cart from rolling while the groceries are being unloaded and the placed in the automobile, or when the cart is left unatttended after unloading.

It is the purpose of the present invention to provide a telescoping grocery cart or a so-called carry-out cart of the same type with a brake which will be automatically applied when the customer removes his hands from the handle bar or otherwise fails to personally control same.

A further object of the invention is to provide a brake which will be automatically applied when a customer's hand is removed from the handle bar and associated brake handle and which brake will automatically be released when one cart is telescoped within another cart of similar construction so as to facilitate the handling of groups of carts.

Another object of the invention is to provide a simple fool-proof brake mechanism which is positive in actuation and automatic in function under all conditions.

Another object of the invention is to provide a structure which can be readily applied to the old conventional telescoping grocery cart and to new equipment.

These and further objects of the invention will more clearly hereinafter appear by reference to the accompanying drawings forming a part of the instant specification, wherein like characters of reference designate corresponding parts throughout the several views, in which:

Fig. 1 is a perspective view of a telescoping cart showing the present invention attached;

Fig. 5 is a section taken on line 5—5 of Fig. 1;

Fig. 6 is a fragmentary elevation of a modified form of the invention; and

Fig. 7 is a fragmentary elevation of one end of the operating handle.

Figure 2:
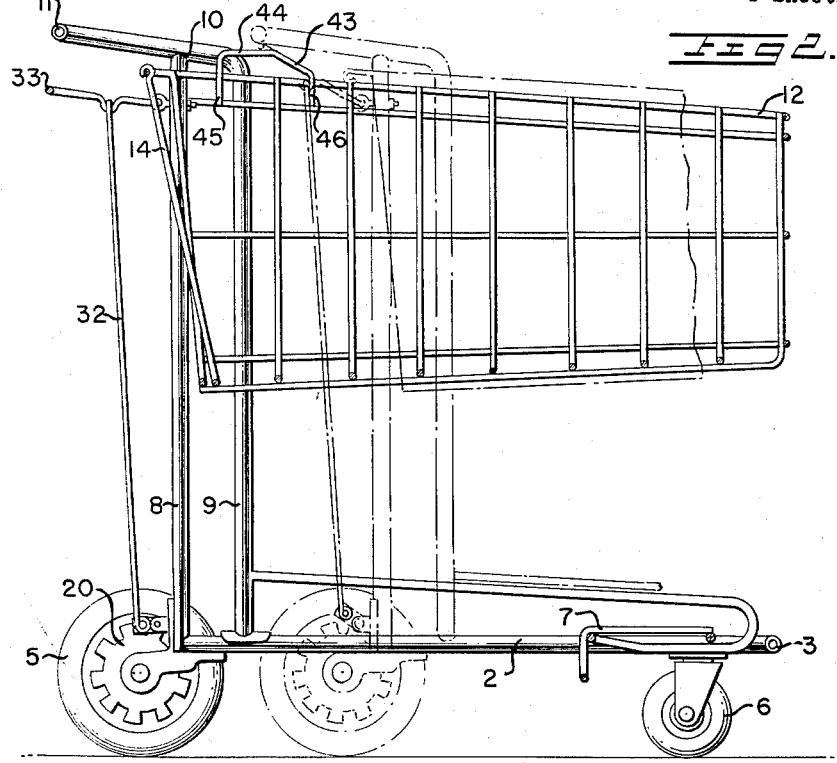
Fig. 2 is a sectional view illustrating the position of the parts when a pair of carts are in telescopic association.
Figure 3:
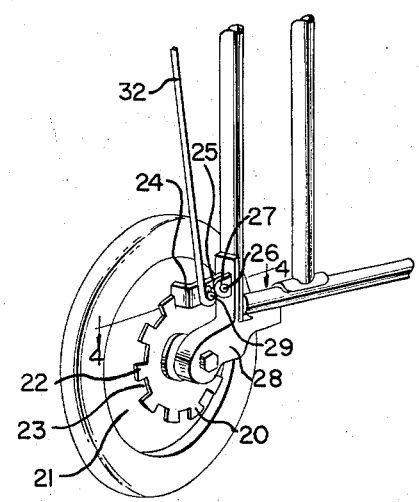
Fig. 3 is a detailed perspective view of the brake mechanism.
Figure 4:
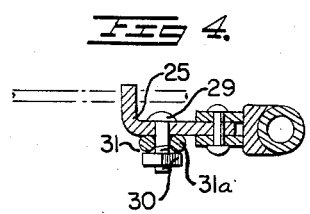
Fig. 4 is an enlarged fragmentary sectional view on line 4—4 of Fig. 3 showing the locking pawl.

In the present illustration the structure is more of the telescoping carry-out cart type embodying the lower frame of general U-shape including the side arms or frame members 1 and 2 and the base portion 3. Outwardly positioned rear wheels are shown at 4 and 5 with the usual swivel front casters at 6, the latter being mounted on a transverse plate 7 fixed to the underside of arms 1 and 2. At the rear of each of the side arms 1 and 2 are a pair of uprights, the rear uprights being illustrated at 8 and the front uprights at 9. The front uprights 9 extend upwardly and are bent rearwardly and secured to the top of the rear uprights at 10 and are united by the handle bar 11 which is positioned to the rear of the upper telescoping basket 12 to provide a handle for manipulation of the device.

The basket 12 is of conventional form embodying forwardly converging side walls and upwardly inclined bottom wall joined by an end wall structure. The taper of the basket is such as to facilitate nesting with a basket of similar construction and in this connection the basket is provided at its rear with a hinged gate 14 to permit upward swinging movement of the gate when a pair of baskets are moved together into nested association.

It will be apparent that so far the cart is a generally conventional telescoping type including front casters 6 and rear wheels 4 and 5 and it is known that these wheels are normally provided with ball bearings to facilitate handling under loaded conditions. A cart of this type left on an incline will tend to free wheel and when loaded will increase its speed and may cause damage from impact. In addition after a cart of this type has been unloaded a customer is inclined to park it, or endeavor to park it, on the parking lot normally having an inclined surface for drainage until such time as a service man is available for collecting the carts. Obviously these carts become a menace if left in an uncontrolled state and will be inclined to free wheel about the lot or be subject to such free wheeling due to contact with moving vehicles which may be entering or leaving the lot.

The present invention embodies a braking system including annular ratchet plates 20 which can be fixed as by spot welding to the inner wheel structure 21 of either or both of the rear wheels 4 or 5. In the present instance, both of the rear wheels are provided with these ratchet plates 20, the peripheries of which are provided with arcuate ratchet teeth 22 defined by recesses 23 throughout their periphery. The recesses 23 between the ratchet teeth 22 are adapted to receive a pawl extremity 24 extending laterally from the pivoted pawl body 25 mounted on the pivot pin 26 fixed between ears 27 extending from the wheel mount 28. Each of these pawl bodies 25 has inwardly projecting pins or bolts 29, the pins or bolts having enlarged heads 30 defining annular recesses 31 between the head 30 and the adjacent pawl body 25 for receiving the looped end 31ª of an actuating link 32 depending from a control bar 33.

The control cross bar 33 is of generally U-shaped form including forwardly facing side arms 34 having medial downwardly looped portions 35 for receiving the eye extremity 36 at the upper end of the actuating link 32. Normally two of the links 32 are provided for actuating a pair of pawls 24 engaging the ratchet plates 20 fixed on the inner face of each of the rear wheels 4 and 5. The forward ends 39 of the arms 34 are bent inwardly for reception in the eye 40 of the hanger 41, the shanks of which are threaded at 42 and extend through the rear uprights 8 and are secured by nuts or other suitable means. The extremities 39 of the arms 34 which project inwardly into the eye 40 are bent at their inner portions to prevent accidental removal and the fitting between the inner extensions 39 and the eye 40 is such as to permit free pivotal movement of the arms 34. The control cross bar 33 connecting the arms 34 is positioned immediately below the handle 11 of the telescoping cart assembly so that an operator can readily actuate the cross bar 33 and lift it up toward and against the handle 11 without any difficulty and without the use of more than one hand. The spacing of the cross bar 33 from the handle 11 is sufficient to permit a movement clearing the pawls from engagement with the ratchet teeth 22. It will be noted that the ratchet brake assembly is such that the parts are freely movable for operation to locking position by gravity when not under manual control.

In instances when a pair of carts are to be telescopically associated, it is necessary that the brakes of all carts except the outer one be disengaged so that the carts may be simultaneously manipulated by an operator in control of the outer cart. In other words, it is customary for a single attendant to collect and telescope or stack together a number of carts for storage. If the carts were left in locked position it would be obvious that a single operator could not manipulate more than one cart because the second cart and additional carts which might be telescopically associated would have their brakes applied. In order to release the brakes of a second cart during the telescoping operation there is provided a pair of cam tracks 43 fixed to each of the side walls of the basket. The cams 43 terminate outwardly in a horizontal supporting area 44 having depending rear leg 45 welded to the adjacent basket structure. The forward end of the cam 43 has depending leg 46 which likewise is fixed to the adjacent horizontal basket structure.

As a result of these cam tracks it will be obvious that when a pair of carts are nested the control bar 33 will ride over the cam faces 43 and rest on the upper horizontal portion of the trackway at 44, thus holding the brake pawl out of engagement with the teeth of the brake plate and permitting free wheeling of the telescoping cart. This operation can be repeated so that a single operator in manipulating a number of carts can rely upon the frictional engagement between the telescoping carts for momentum which is unimpaired by any brake force from the brake assembly. Similarly the attendant can brake or release the brake in the first cart under his immediate control for locking a horizontal stacked assembly of carts together.

Figures 6 and 7 comprehend a modified form of the instant invention in which a different type of brake and brake actuator is illustrated. In this form of the invention the structure of the cart includes the horizontal frame member 50 and the spaced uprights 51 and 52, the uprights being the supporting structure for the basket, a portion of the horizontal frame of which is illustrated at 53. One of the rear supporting wheels is illustrated at 55 and the brake is applied to these rear wheels 55 through a structure to be hereinafter described. The brake assembly embodies a pair of horizontal links 56, one of which is shown and each of these links 56 are pivoted at 57 to a supporting plate 58 welded or otherwise secured to the horizontal frame member 50. Medial of the links 56 there is provided a laterally extending pin 59ª about which is hooked the upper extremity of a rod 59, this rod extending through the plate 58 and the horizontal frame 50 in a manner to insure freedom of vertical movement. The lower end of the rod 59 extends through the horizontal brake arm 60 and is secured by a nut 61. The brake arm 60 mounts a coil spring 62 which is interposed between this brake arm and the lower surface of the horizontal frame member 50 to normally urge the brake arm 60 downward to apply the brake element 63 to the wheel 55 to secure the wheels against rotation and maintain the cart against rolling.

When the brakes are to be released from engagement with the wheels, the brake arm 60 must be elevated and this operation is brought about by the use of the connecting links 65 and 66 which are loosely jointed together as at 67. The lower end of link 65 loops about a laterally extending pin 68 at the free end of the pivoted links 56 as shown at 69 so that vertical movement of the link 65 will lift the pivot brake arm 60 vertically and carry with it the actuating rod 59 to free the brake 63 from engagement with the wheel. It will be obvious that normally the spring 62 will maintain the brake applied to the wheel structure; however, during telescopic association of carts when the brakes are to be released this operation is provided by engagement of the inclined rim of one telescopic cart as shown in 70 in Fig. 7 with the inturned arm 71 of the brake of an associated cart.

The movement of the telescoping cart part 70 will gradually lift the link 66 and release the brake. This same operation is available by manual operation of the handle 72 which connects as at 73 with the inturned upper extremities of the link 66 at each side of the cart structure.

It will be obvious that all forms of the invention actuate the brake in substantially the same manner and under the same conditions. The modified form described may be applied to any type of telescopic cart structure in which the associated parts of the telescoping carts include co-acting inclined surfaces for the functioning of the braking apparatus.

What is claimed is:

1. In a telescoping cart having a frame, a basket carried by the frame, a handle bar for the basket, said basket having converging side walls generally tapering forwardly for telescopic association with a basket of a cart of similar construction, a downwardly and forwardly inclined cam fixed to the upper face of one of said side walls and projecting thereabove, wheels for said cart, a normally applied brake for one of said wheels, an actuating rod for said brake, an operating means connected with said actuating rod and located adjacent to and below said handle bar, said operating means normally lying in a plane below the upper face of said cam, whereby during telescopic association of one telescoping cart with another said cam engages the operating means which lifts the actuating rod of the front cart to release said brake.

2. The structure of claim 1 characterized in that the operating means connected with the actuating rod and located adjacent to and below the handle bar comprises a U-shaped frame member, the extremities of the legs of which are pivotally connected to the frame.

3. The structure of claim 1 characterized in that the actuating rod for the operating means comprises a U-shaped frame having its extremities pivotally connected to the frame, one of the arms of the U-shaped frame having a recess formed therein for suspending the upper extremity of the actuating rod.

4. The structure of claim 1 characterized in that the downwardly and forwardly inclined cam fixed to the upper face of one of the side walls comprises an inverted U-shaped structure, the forward end of which is inclined downwardly and the rearward portion of which lies generally in a horizontal plane.

5. The structure of claim 1 characterized in that more than one wheel is provided with a brake and multiple actuating rods connect the brakes with spaced arms of the operating means.

References Cited in the file of this patent

UNITED STATES PATENTS

| 717,922 | Ramscar | Jan. 6, 1903 |
| 754,510 | Snyder | Mar. 15, 1904 |
| 2,176,472 | Rogers et al. | Oct. 17, 1939 |
| 2,639,161 | Goldman | May 19, 1953 |
| 2,785,906 | Matter | Mar. 19, 1957 |